United States Patent Office 3,374,835
Patented Mar. 26, 1968

3,374,835
FRACTURE ACIDIZING
John A. Knox, Duncan, Okla., assignor to Halliburton Company, Duncan, Okla., a corporation of Delaware
No Drawing. Filed Jan. 21, 1966, Ser. No. 522,019
9 Claims. (Cl. 166—42)

ABSTRACT OF THE DISCLOSURE

Fracture acidizing of a well is accomplished by injecting into an earthen formation an oily fluid composition having dispersed therein a finely divided acid soluble fluid loss component and then injecting into the formation an aqueous acidizing fluid capable of dissolving the fluid loss component.

---

This invention pertains to the treatment of oil and gas wells or the like, and has particular reference to fluid loss additives for use in a method of fracture acidizing.

Various materials have heretofore been proposed and used for the reduction of fluid loss from fluids used in wells to stimulate the production of oil or gas. Including among such materials have been gel-forming constituents such as soap thickeners, natural gums, finely divided minerals and various combinations thereof. While such materials do improve the fluid loss properties of the fluids to which they are added, they are subject to one or more disadvantages. Particularly troublesome has been the tendency of many such materials to cause damage to the producing formation such as by plugging or reducing the permeability of the formation zone under treatment. If permanent damage is not done, at least expensive and time-consuming clean-up operations are often required to remove the fluid loss material from the permeable zones into which it has penetrated.

In fracture acidizing, it is often desirable to retard the acid reaction with the formation while extending the fracture to the greatest possible extent. One method of retarding the reaction of the acid is to pre-flush the formation with an oily fluid. The rock formation containing the oil will react much more slowly with the acid which follows. According to the present invention, it has been discovered that by the addition of an acid soluble fluid loss additive to the oil pre-flush, the oil will be contained in the fracture and will extend it more efficiently. The fluid loss additive is removed, at least to a substantial extent, by the subsequent acid treatment leaving the formation free of plugging residues.

Accordingly, it is a principal object of my invention to provide a novel method of fracture acidizing using an oil pre-flush containing a low fluid loss additive to avoid the above-mentioned and other disadvantages previously encountered.

Another object of this invention is to provide a method of using an oil pre-flush containing an acid soluble fluid loss additive.

These and other objects of the invention will become apparent from the more detailed description which follows.

Briefly, the present invention comprises a method of fracture acidizing an earthen formation surrounding a well using a novel oily well pretreating fluid having dispersed therein a finely divided acid soluble fluid loss additive. The process comprises the injection of the oily fluid containing the finely divided fluid loss additive component dispersed therein into the formation surrounding the well. After the placement of the fluid loss additive components in the formation, the acidizing may be accomplished by the injection of any conventional aqueous acidizing fluid.

In general, the fluid loss additive is a material which can be dissolved by the acid which follows the fluid loss additive. In this way the acid which follows the oil medium containing the fluid loss additive will be retarded, but the acid will eventually dissolve the fluid loss additive while etching the fracture face and in turn provide high fracture flow capacity. The dissolving action on the fluid loss system results in an undamaged fracture face.

The total amount of fluid loss additive in the oil pre-flush is generally sufficient to substantially reduce loss of fluid from said medium to the surrounding formation. Within these limits, the amount of fluid loss additive used is not critical, and generally corresponds from about 10 to 100 pounds per 1000 gallons of the oil pre-flush.

It will be readily understood by those skilled in the art that the use of the oil pre-flush containing the fluid loss additives of the present invention and the acidizing fluids are generally in accordance with the procedures as normally carried out, the fluids being pumped into the well and out into the formation at the desired location utilizing well-known methods and equipment. Thus, in carrying out the injection of the oil medium containing the fluid loss additive or the acidizing operation, the fluids are introduced into the well and then into the well formation in any convenient manner as by pumping. After injection of the fluid into the formation, the well may be closed in to allow time for the acid, for example, to attack the formation. The spent acid may be withdrawn as by pumping, bailing or allowing the well to flow, if it will.

The exact behavior of the hole treating fluid in the well cannot be known with certainty and it is understood that the invention is not limited to any particular theory of its behavior. However, with regard to the function of the fluid loss additive in the oil medium it is believed that the superior results obtained are due to the inclusion in the oil medium of relatively small quantities of the compatible acid soluble fluid loss additives. For example, the finely divided calcium carbonate behaves somewhat as a temporary plugging or bridging agent which is dispersed throughout the oil medium and is forced into contact with the porous well strata. The fluid loss additives being of small size and weight do not readily settle out of the oil medium but are carried by the medium into fissures and crevices and then into plugging or bridging relation to adjacent pores or other small openings in the well strata. The result is that the low fluid loss additive provides a combined plugging or bridging and plastering effect which reduces the fluid loss into the strata and thereby tends to confine the treating solutions to the desired zone. The fluid loss additive is generally present in an amount which is not sufficient to appreciably increase the apparent viscosity of the oil medium, the relatively low viscosity thereof permitting higher pumping rates to be obtained, thus facilitating the obtaining of a higher rate of fluid injection and increased fluid penetration into the zone of the formation.

Any oily material capable of wetting the rock formation may be used as the carrier in the pre-flush. Typical of such materials are kerosene, tall oil fatty acids, crude oil and diesel oil. A great variety of acid and/or water soluble materials can be utilized in the oil medium of the present invention. In general, it is advantageous to utilize a particular particle size range in order to provide optimum wetting and mixing action for dispersion of any given material. The appropriate particle size distribution for any given material may be readily determined by those skilled in the art. Suitable materials include the chlorides, bromides, iodides, nitrates, carbonates, oxides, hydroxides, borates, acetates, lactates and citrates of lithium, potassium, sodium, calcium and magnesium. Another class of materials includes the lithium, potassium, calcium, magnesium and sodium salts and mixtures thereof of fatty acids, sulfonic acids and carboxylic acids, preferably those having a melting point greater than 100° C. Still another suitable material includes low molecular weight substittued organic acids and substituted polyalcohols. Particular examples of these materials are sugars, natural gums, starches, water soluble synthetic acrylic and acrylamide polymers, nylon (acid soluble), water soluble cellulose polymers (carboxymethyl cellulose), 2,4-dinitro acetic acid, ascorbic acid, carboxylic acid, benzene penta carboxylic acid, 3,3-biphenyl dicarboxylic acid, benzene sulfonic acids, (5-amino-2,4-dimethyl benzene sulfonic acid), 3-amino benzoic acid, 3,5-dinitro benzoic acid, 3-hydroxy benzoic acid, 1,2,3,4-butane tetracarboxylic acid, 2 - carboxy cinnamic acid, 2 - carboxyphenyl acrylic acid, citric acid, heptane dioic acid, isocamphoric aid, 2,3-naphthalene dicarboxylic acid, 7-hydroxy naphthalene sulfonic acid, acetone dicaboxylic acid, phthalic acid (benzene dicarboxylic), dimethyl fumaric acid, pyridine dicarboxylic acid, hydroxy quinoline sulfonic acid, succinic acid, toluene sulfonic acid, sulfamic acid, paraformaldehyde, meta amino acetanalide, trimethyl amine oxide, trimethyl amine oxide hydrochloride, aniline hydrochloride, aniline picrate, dihydroxy anthraquinone, acetamid, glycine hydrochloride, N-benzoyl lysine, pyridinium hydrochloride, urea, 1-(4-tolyl)urea. A preferred particle size distribution (Tyler mesh) of the fluid loss additives utilized in the present invention is as follows:

20% on 100
40% —100+200
40% —200

The acidizing fluids employed in the process of the present invention may be any of those familiar to those skilled in the art including hydrochloric acid, hydrofluoric acid, acetic acid, formic acid, and other acids commonly utilized as well as mixtures of such acids. The acidizing fluids may contain retarders which reduce the reaction rate between the acid and the formation. The preferred retarders are those disclosed in assignee's copending application Ser. No. 399,251, now U.S. Patent No. 3,319,714.

One newly developed method of retarding the reaction of the acid is to add an oil soluble or partially oil soluble wetting agent to an oily medium which precedes the acid into the formation. The oil containing the wetting agent more effectively wets the rock. This method is described more fully in assignee's copending United States application Ser. No. 503,069, now U.S. Patent No. 3,343,602. Preferably the fluid loss additive used in the practice of this invention is one which is compatible with oil soluble or partially oil soluble wetting agents, permitting the use of both a wetting agent and the fluid loss additives in the oil pre-flush. The oil soluble wetting agents employed in the oil medium may be any of those disclosed in assignee's above-identified copending U.S. application.

The following example is presented solely to illustrate the invention and should not be regarded as limiting in any way. In the examples, the parts and percentages are by weight unless otherwise indicated.

EXAMPLE

The kerosene permeability of Bedford limestone having a diameter of 1⅞ inches and a length of 1 inch was first measured. The kerosene flow through the limestone core at 76° F. and 1000 pounds per square inch was as indicated. Next the limestone core was treated with a pad volume of oil fluid (kerosene) containing 50 pounds of the fluid loss additive (mixed sodium calcium salts of alkyl aryl sulfonic acid and described in greater detail in U.S. Patent No. 2,779,735) to 1000 gallons at 76° F. and 1000 pounds per square inch for 20 minutes. Finally, the fluid remaining from the pad volume was removed and replaced with 15% hydrochloric acid solution. The loss of acid was measured at 76° F. and 1000 pounds per square inch.

| Step #1 | | Step #2 | | | Step #3 | |
| --- | --- | --- | --- | --- | --- | --- |
| Formation | Kero. flow | Fluid | Add. | Fluid Loss | Fluid | Fluid Loss |
| Bedford Limestone | Too fast to meas | Kerosene | 50# Mark II | No spurt loss: 3 ml., 20 min. | 15% HCl | Break thru immediately. |
| Do | do | do | do | No spurt loss: 4 ml., 20 min. | 15% HCl | Do. |
| Do | do | do | do | 5 ml., 20 min. | 15% HCl | Do. |
| Do | do | do | do | 8 ml., 20 min. | 15% HCl | Do. |
| Do | do | do | do | 4 ml., 20 min. | 15% HCl | Do. |
| Do | do | do | do | No spurt loss: 5 ml., 20 min. | 15% HCl | Do. |

The foregoing data clearly indicate the effectiveness of acid injecting an oil containing soluble fluid loss additive ahead of the hydrochloric acid in the treatment of limestone formations.

The acidizing fluids employed in the process of this invention may also contain fluid loss additives. While not limited thereto, any of the fluid loss additives disclosed in assignee's copending U.S. patent application Ser. No. 406,903, now abandoned, the disclosure of which is incorporated herein by reference, may be employed in the acidizing fluids.

Having fully described the invention, it is intended that it be limited only by the lawful scope of the appended claims.

I claim:

1. A method of fracture acidizing an earthen formation surrounding a well which comprises the steps of injecting into the formation an oily fluid composition having dispersed therein a finely divided acid soluble fluid loss component; the total amount of said fluid loss component being sufficient to substantially reduce loss of fluid from said composition to said formation; and then injecting into the formation an aqueous acidizing fluid capable of dissolving said fluid loss component.

2. The method of claim 1 wherein the fluid loss component comprises the mixed sodium-calcium salts of alkyl aryl sulfonic acid.

3. The method of claim 1 wherein the aqueous acidizing fluid comprises hydrochloric acid.

4. The method of claim 1 wherein the formation comprises limestone.

5. The method of claim 1 wherein the fluid loss component is present in the oily fluid composition in an amount of from about 10 to 100 pounds per 1000 gallons of fluid.

6. The method of claim 1 wherein the oily fluid comprises kerosene.

7. The method of claim 1 wherein the fluid loss component comprises an acid soluble natural gum.

8. A method of fracture acidizing an earthen formation surrounding a well which comprises the steps of injecting into the formation an oily fluid composition containing an oil soluble surface active agent and having dispersed therein a finely divided acid soluble fluid loss component, the total amount of said fluid loss component being sufficient to substantially reduce loss of fluid from said composition to said formation; and then injecting into the formation an aqueous acidizing fluid capable of dissolving said fluid loss component.

9. A method of fracture acidizing an earthen formation surrounding a well which comprises the steps of injecting into the formation an oily fluid composition comprising kerosene containing an oil soluble surface active agent and having dispersed therein a finely divided acid soluble fluid loss component, the total amount of said fluid loss component being sufficient to substantially reduce loss of fluid from said composition to said formation; and then injecting into the formation an aqueous acidizing fluid capable of dissolving said fluid loss component.

References Cited

UNITED STATES PATENTS

| | | | |
|---|---|---|---|
| 2,689,009 | 9/1954 | Brainerd et al. | 166—42 |
| 3,044,549 | 7/1962 | Jones | 166—42 |
| 3,046,222 | 7/1962 | Phansalkar et al. | 252—8.55 |
| 3,065,171 | 11/1962 | Morrow et al. | 252—8.55 |
| 3,233,673 | 2/1966 | Spain et al. | 166—42 |
| 3,319,714 | 5/1967 | Knox | 166—42 |

STEPHEN J. NOVOSAD, *Primary Examiner.*